R. W. PARRAMORE.
PLOW ATTACHMENT.
APPLICATION FILED OCT. 31, 1914.
1,138,307.
Patented May 4, 1915.
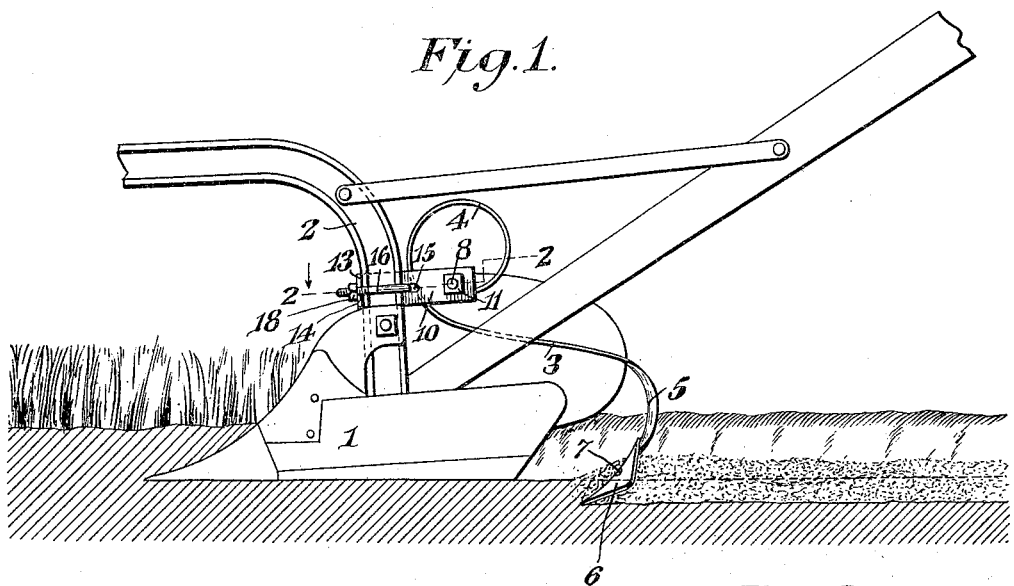
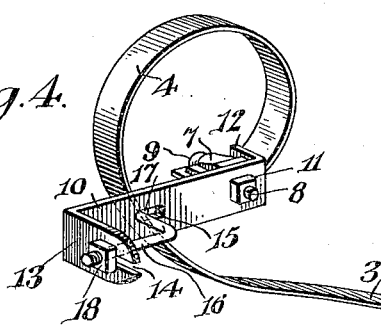
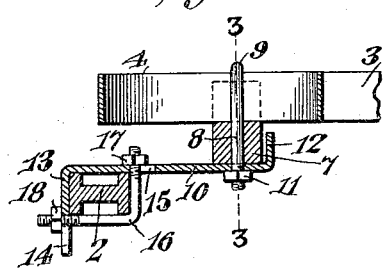
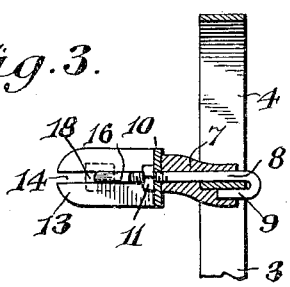
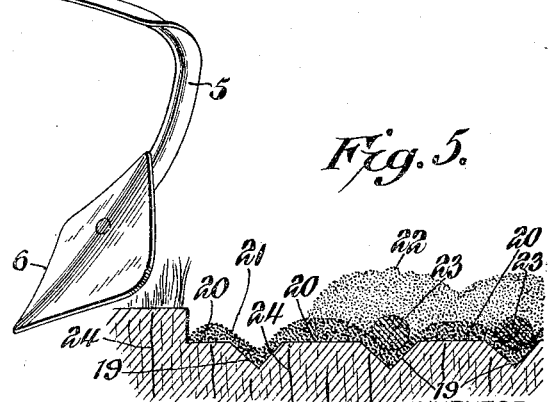
WITNESSES
Jas. K. McCathran
F. T. Chapman
Reddin W. Parramore, INVENTOR
BY C. G. Siggers
ATTORNEY
THE NORRIS PETERS CO., PHOTO-LITHO., WASHINGTON, D. C.

UNITED STATES PATENT OFFICE.

REDDIN W. PARRAMORE, OF SOMERVILLE, NEW JERSEY.

PLOW ATTACHMENT.

1,138,307.     Specification of Letters Patent.     Patented May 4, 1915.

Application filed October 31, 1914. Serial No. 869,662.

*To all whom it may concern:*

Be it known that I, REDDIN W. PARRAMORE, a citizen of the United States, residing at Somerville, in the county of Somerset and State of New Jersey, have invented a new and useful Plow Attachment, of which the following is a specification.

This invention has reference to an attachment to turning plows, and its object is to provide means whereby the bottom of the furrow is loosened up or pulverized to a greater depth than the cut produced by the plow, so that the soil turned over from the next adjacent furrow is deposited upon an already disturbed and softened layer of subsoil in such a manner that vegetable matter growing on the field being plowed, is crowded into long grooves formed in the bottom of the preceding furrow lengthwise thereof, and having an underlying layer of pulverized soil.

By the present invention there is provided a means for preparing the soil so that growing vegetable matter turned under is gathered into long and relatively narrow grooves arranged between shelves or plateaus of more compact material in the bottom of the furrow, which grooves are caused by the passage of the plow, the bottoms and sides of these grooves, as well as the plateaus, being more or less covered by pulverized soil, so that the turned-over vegetable matter rests upon a bed of pulverized soil and is overlaid by the soil turned over by the plow.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a side elevation of a plow with the attachment applied and showing more or less schematically the effect of the plow and the attachment thereto. Fig. 2 is a fragmentary section on the line 2—2 of Fig. 1. Fig. 3 is a section on the line 3—3 of Fig. 2. Fig. 4 is a perspective view of the attachment. Fig. 5 is a more or less schematic cross-section of a number of adjacent furrows showing the condition produced on the ground by the present invention.

Referring to the drawings there is shown a plow 1 provided with a standard 2, and as this plow may be a turn plow of known construction, which construction does not enter into the present invention, it is not deemed necessary to either show or describe the plow in detail. There is also shown a spring arm or standard 3 which in the particular showing of the drawings is in the form of an elongated flat strip which may be composed of spring steel, or at least of steel having sufficient elasticity for the purpose. One end of this arm is formed into a volute 4, and the other end is bent at an angle to the general length of the arm, and the side portions of the arm are there folded upon each other, as shown at 5, in order that the end 5 of the arm may be relatively stiff. The extremity of the stiffened end 5 of the arm carries a share or hoe 6 held thereto by a bolt 7, or in any other appropriate manner.

The free end of the volute 4, this being the inner end of the volute, is inserted edgewise into a clip block 7, and is there held by a hook bolt 8 extended through the block and provided with a hook-shaped extremity 9 for engaging the edge of the volute 4 remote from that seated in the block. The other end of the bolt 8 is threaded and extends through one arm of an angle bracket 10, the block 7 being secured to the bracket 10 by a nut 11 applied to the threaded end of the bolt on the face of the bracket remote from the block 7. The bracket 10 and block 7 are held in immovable relation one to the other by an angular extension 12 of the bracket 10.

At that end of the bracket remote from the angular extension 12 there is an oppositely directed angular extension 13 provided with a longitudinally disposed entering recess 14 at the outer end of the extension 13. At a point intermediate of the ends of the bracket there is formed a longitudinally extended slot 15. There is also provided an angle bolt 16 having one end extending through the slot 15 and the other end through the recess 14, this bolt 16 being designed to embrace the standard 2 to hold the bracket 10 thereto with the extention 13 against one edge of the standard, while the bolt 16 extends along that side of the standard remote from the bracket 10 and also across the other edge of the standard, the bolt being secured in place by nuts 17 and 18, respectively. This provides for the securing of the attachment of the present invention to the standard 2 of the plow in any desired adjusted position, the arrangement being such that the attachment is firmly clamped to the plow standard, but may be readily detached or loosened and adjusted therealong as desired. The angle bolt 16 together with the recess 14 and slot 15 provides for the ready application of the attachment to different plows.

By making the greater portion of the length of the arm 3 of flat steel terminating at one end in the volute 4, with the free end of this volute anchored near its extremity in the block 7 rigidly attached to the plow standard 2, the hoe at the other end of the arm has great freedom of movement, since it may rise and fall or move sidewise quite readily. The end 5 of the arm 3 being at an angle to the general length of the arm 3, and immediately carrying the hoe or share 6, is made stiff or relatively unyielding in itself to permit the various changes of position of the hoe without any material bending of the end 5.

The attachment is applied to the plow standard so that the hoe or share 6 is in trailing relation to the plow and about in line with the middle of the furrow produced by the plow, and the point of the hoe will enter the bottom of the furrow for about two inches more or less. The hoe 6 is shown as of the diamond or pointed type, so that the ground is disturbed and so displaced to fall in part back again into the groove and in part upon the shelves or plateaus at the sides of the groove. The disturbance and displacement of the ground augmented by the trembling of the elastically mounted hoe, serves to break up and more or less pulverize the ground.

As the plow proceeds in the usual manner to form a furrow, it may be so managed that the furrow is, say, six inches deep and, therefore, the hoe or share 6 in disturbing the ground for a depth of about two inches pulverizes the earth in the furrow to a depth about eight inches from the surface of the ground. This trailing hoe-like structure, being mounted for great freedom of movement because of the elastic arm 3 and the attachment of the arm by a still further elastic connection, due to the presence of the volute 4, to the plow standard, permits the hoe to yield or lag as the plow moves forward until the spring arm is put under such tension as to impel the hoe forwardly at a greater speed than the travel of the plow, and this forward movement is quickly checked by the relaxation of tension on the arm 3 due to the quick forward movement. There is therefore produced a forward and rearward vibration with sidewise yielding, which keeps the hoe within the furrow at the bottom thereof independently of the rocking of the plow to which it is attached. The result is that the alternate lagging and forward jump of the hoe 6 causes the hoe to be in a practically constant state of tremor, thus most effectively pulverizing the soil and avoiding any large lumps. The sharp pointed or diamond shaped plow permits a considerable quantity of the pulverized soil to fall back into the V-shaped groove, thereby forming a soft bed for the subsequently deposited vegetable matter, the groove being widened and less abrupt on the side walls because of the partial filling of the groove and the piling of the pulverized soil on opposite sides of the groove.

The pulverized subsurface soil together with the vegetable matter directly overlying it, forms a practical and successful retaining means for moisture, while the vegetable matter itself constitutes a plant food for growing crops.

The present invention is not designed to break the soil to a great depth or to a greater depth than that usual with a turn plow, but to pulverize the soil underlying the vegetable matter at whatever depth it is desired to place it. The freely vibratile supporting arm for the hoe or share permits great freedom of vibratile movement of the hoe or share in action, and this has been found to be of very material importance in the attainment of the results sought, that is, the preparation of the subsoil by pulverizing it and the formation of a corrugated surface at the bottom of the furrow, which when the vegetable matter is deposited upon the pulverized subsoil and pressed down serves to obviate washing or erosion.

It has been found in practice that the ground so prepared holds water effectively, and experience has demonstrated that an increased yield, in some cases as much as one hundred per cent, has resulted from the use of the attachment of the present invention, and in every case the increase in the yield is marked.

If it be assumed by way of example that there is a field of growing rye which it is desired to turn under, this rye without the attachment of the present invention and by the ordinary methods in vogue, would be placed at the bottom of each furrow on a hard surface irrespective of the depth of the plowing. With the attachment applied the first six inches, more or less, of the soil can be turned over, while the next two inches more or less, can be pulverized and remain in the bottom of the furrow in the form of a more or less pronounced groove, and it is upon this pulverized layer that the vegetable matter is deposited. Under the conditions assumed the soil is broken eight inches deep and the vegetable matter is placed from four or six inches deep as may be desired.

A distinguishing feature of the present invention over the action of an ordinary subsoil plow is in the spring or tremor action of the attachment allowing a movement or vibration independent of the turn plow. Moreover, should the hoe 6 strike a sunken stone or root it is capable of side movement, or of jumping over such obstruction without in any way affecting the action of the turn plow to which it is attached. The pulverized soil below the vegetable deposit together with the latter, constitutes a reservoir for holding water only limited in its holding capacity by the depth and character of the breaking. With respect to the mounting of the hoe or share 6, I claim to be the first to so mount the hoe that it has a practically constant tremor while in operation, whereby not only is the groove produced but the disturbed soil is most effectively pulverized. I do not wish to be limited to the means employed for accomplishing this result, as there is much room for variation from the construction shown which is illustrative only.

In Fig. 5 a number of grooves 19 are shown in as many furrows, these grooves being separated by shelves or plateaus 20 representing the floor of the furrow as produced by the plow. The pulverized earth is indicated at 21, while the turned over earth is represented at 22. The vegetable matter is indicated at 23 as more or less compacted and deposited on the pulverized earth 21 partly filling the grooves 19.

The pore lines in the undisturbed ground are indicated at 24 and indicate the course of water rising to the surface by capillary attraction.

What is claimed is:—

1. The combination with a turn plow, of a subsoil pulverizer comprising a share or hoe in trailing relation to the plow, and substantially in line with the middle of the furrow produced by the plow and arranged to cut a groove in the bottom of said furrow, and carrying means for the share or hoe attached to the plow and yieldable both laterally and longitudinally of the line of travel of the plow.

2. The combination with a turn plow, of a subsoil pulverizer comprising a share or hoe in trailing relation to the plow, and extending to a lower level than said plow and serving to cut a V-shaped groove in the bottom of the furrow made by said plow, leaving shelves or plateaus on each side of the groove, and carrying means for the share or hoe attached to the plow and yieldable both laterally and longitudinally of the line of travel of the plow, and said carrying means being also yieldable in an up and down direction.

3. The combination with a turn plow, of a subsoil pulverizer comprising a share or hoe in trailing relation to the plow and substantially in line with the middle of the furrow produced by the plow, and an elastic mounting therefor normally locating the earth-entering end of the share or hoe at a lower level than the bottom of the plow, and yieldable both longitudinally and laterally and up and down with reference to the line of travel of the plow to constitute a vibratile support for the hoe or share, whereby it will form a groove in the bottom of the furrow and there pulverize the soil.

4. The combination with a turn plow, of a share or hoe having a single elastic arm, means for attaching the said arm at a single point to the standard of the plow above the plow proper, the share or hoe assuming a trailing relation to the plow with its lower end below the bottom of the plow, whereby the attachment is capable while at work of constant intervibration independent of the plow to which it is attached.

5. The combination with a turn plow, a bracket attached to the standard of the plow above the plow proper and projecting therefrom, a spring arm formed at one end into a volute, means for connecting the free end of the volute to the outer end of the bracket, the volute curving upwardly and forwardly from its point of attachment to the bracket and then downwardly beneath the same and merging into an elongated flat strip, then bent at an angle and formed with a foot, and a hoe or share connected to the foot and arranged in trailing relation to and extending below the level of the plow proper and adapted to form a groove in the bottom of the furrow made by the plow.

6. The combination with a turn plow, of a share or hoe, a supporting arm carrying the share or hoe at one end and comprising an elongated flat strip of metal stiffened at the end carrying the share or hoe and at the other end formed into a volute, and sustaining and connecting means for the extremity of the volute end of the strip carried by the plow, said hoe being arranged substantially in line with the middle of the furrow produced by the plow and adapted to cut a groove in the bottom of said furrow.

7. The combination with a turn plow, of a share or hoe, an elastic arm to one end of which the share or hoe is secured, and means at the other end of the arm attached to the standard of the plow above the attachment of the plow proper thereto and comprising a bracket with an intermediate longitudinal slot, and an angle extremity having a longitudinal entering recess at its free end, and an angle bolt having one end extended through the slot and the other through the recess and adapted to coact with the bracket to embrace the standard of the plow.

In testimony, that I claim the foregoing as my own, I have hereto affixed my signature in the presence of two witnesses.

REDDIN W. PARRAMORE.

Witnesses:
 JOHN H. SIGGERS,
 F. T. CHAPMAN.

Copies of this patent may be obtained for five cents each, by addressing the "Commissioner of Patents, Washington, D. C."